United States Patent
Chen et al.

(10) Patent No.: US 9,431,854 B2
(45) Date of Patent: Aug. 30, 2016

(54) MULTIPLE UPS SYSTEM HAVING MULTI-WAY POWER TIE SYSTEM AND INTELLIGENT POWER SHARING CONTROL

(71) Applicant: Liebert Corporation, Columbus, OH (US)

(72) Inventors: Xian Chen, Columbus, OH (US); Brian P. Heber, Delaware, OH (US)

(73) Assignee: Liebert Corporation, Columbus, OH (US)

( * ) Notice: Subject to any disclaimer, the term of this patent is extended or adjusted under 35 U.S.C. 154(b) by 422 days.

(21) Appl. No.: 14/078,790

(22) Filed: Nov. 13, 2013

(65) Prior Publication Data
US 2014/0159493 A1    Jun. 12, 2014

Related U.S. Application Data

(60) Provisional application No. 61/734,503, filed on Dec. 7, 2012.

(51) Int. Cl.
*H02J 7/00* (2006.01)
*H02J 9/00* (2006.01)
*H02J 9/06* (2006.01)

(52) U.S. Cl.
CPC .............. *H02J 9/062* (2013.01); *Y10T 307/62* (2015.04)

(58) Field of Classification Search
CPC .......... H02J 3/46; H02J 9/062; Y10T 307/62
USPC ....................................... 307/64, 65
See application file for complete search history.

(56) References Cited

U.S. PATENT DOCUMENTS

2007/0114852 A1* 5/2007 Lin ........................... H02J 1/10
                                                                307/66

* cited by examiner

*Primary Examiner* — Carlos Amaya
(74) *Attorney, Agent, or Firm* — Harness, Dickey & Pierce, P.L.C.

(57) ABSTRACT

A multiple UPS system includes a plurality of multi-module UPS subsystems coupled to a power tie cabinet, each multi-module UPS subsystem having a plurality of UPS modules. The power tie cabinet includes one or more controllers, collectively referred to as PTC (power tie cabinet) controls. The PTC controls periodically determine a power error message for each of the multi-module UPS subsystems and pass it to the respective multi-module UPS subsystem. A controller of the multi-module UPS subsystem uses the power error message to determine error data that is provided to a power average control loop used in control of power sharing among the UPS modules of the multi-module UPS subsystem.

10 Claims, 5 Drawing Sheets

US 9,431,854 B2

MULTIPLE UPS SYSTEM HAVING MULTI-WAY POWER TIE SYSTEM AND INTELLIGENT POWER SHARING CONTROL

CROSS-REFERENCE TO RELATED APPLICATIONS

This application claims the benefit of U.S. Provisional Application No. 61/734,503 filed on Dec. 7, 2012. The entire disclosure of the above application is incorporated herein by reference.

FIELD

The present disclosure relates to a multiple uninterruptible power supply (UPS) system having multimodule UPS systems, and more particularly, to a multiple UPS system having a multi-way power tie system and intelligent power sharing control.

BACKGROUND

This section provides background information related to the present disclosure which is not necessarily prior art.

FIG. 1 shows an example of a typical prior art single module UPS system, referred to herein as UPS module 100. The basic elements of UPS module 100 are rectifier 102, inverter 104, output transformer 106, a backup DC power source 108, and a controller 110. UPS module 100 also includes a bypass switch (not shown). An input of rectifier 102 is coupled to a source of AC power (not shown). An output of rectifier 102 is coupled to a DC bus 112. An input of inverter 104 is coupled to DC bus 112. An output 105 of inverter 104 is coupled to a primary side 114 of output transformer 106. A secondary side 116 of output transformer 106 is coupled to output 118 of UPS module 100. A Grass filter circuit 120 is coupled to the secondary side 116 of output transformer 106. A filter circuit 122 is coupled to the primary side 114 of output transformer 106.

Controller 110 controls UPS module 100 including controlling inverter 104 by varying the duty cycle of the switching devices in inverter 104 so that inverter 104 provides a desired output voltage. In this regard, controller 110 has inputs 124 and outputs 126. Inputs 124 include inputs coupled to current transformers CT that sense currents in various parts of UPS module 100 such as shown in FIG. 1, including a load current flowing through output 118 of UPS module 100, and voltage sensors VS that sense voltage such as a primary side voltage at primary side 114 of output transformer 106 or a secondary side voltage at secondary side 116 of output transformer 106.

A multi-module UPS subsystem includes two or more single module UPS systems such as UPS module 100 coupled in parallel. FIG. 2 shows an example of a multi-module UPS 200 having two UPS modules 100 coupled in parallel.

A multiple UPS system includes two or more independent multi-module UPS subsystems, such as multi-module UPS subsystem 200. The multiple UPS system also includes a tie cabinet, which is sometimes referred to as a power tie cabinet. A tie cabinet, as the term implies, is a known device that ties two or more multi-module UPS subsystem 302 together to parallel the output buses of the multi-module subsystem and/or to provide redundancy. This can be momentarily paralleling the output buses to switch a load from one multi-module UPS subsystem to another or continuously paralleling the output buses to provide increased power capacity.

A multi-way power tie system that includes the power tie cabinet builds the connection between a plurality of multi-module UPS subsystems which have multiple UPS modules. More specifically, in one configuration of a multiple UPS system, outputs of a plurality of multi-module UPS subsystems are coupled to inputs of a power tie cabinet and outputs of the power tie cabinet are coupled to loads. In another configuration, there may be a power tie cabinet associated with each multi-module UPS subsystem.

SUMMARY

This section provides a general summary of the disclosure, and is not a comprehensive disclosure of its full scope or all of its features.

In accordance with an aspect of the present disclosure, a multiple UPS system includes a plurality of multi-module UPS subsystems coupled to a power tie cabinet (PTC), each multi-module UPS subsystem having a plurality of UPS modules. The power tie cabinet includes one or more controllers, collectively referred to as power tie cabinet (PTC) controls. The PTC controls periodically determine a power error message for each of the multi-module UPS subsystems and pass it to the respective multi-module UPS subsystem. A controller of the multi-module UPS subsystem uses the power error message to determine error data that is provided to a power average control loop used in control of power sharing among the UPS modules of the multi-module UPS subsystem. In an aspect, the power error message is passed to each multi-module UPS subsystem by the PTC controls every two seconds.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
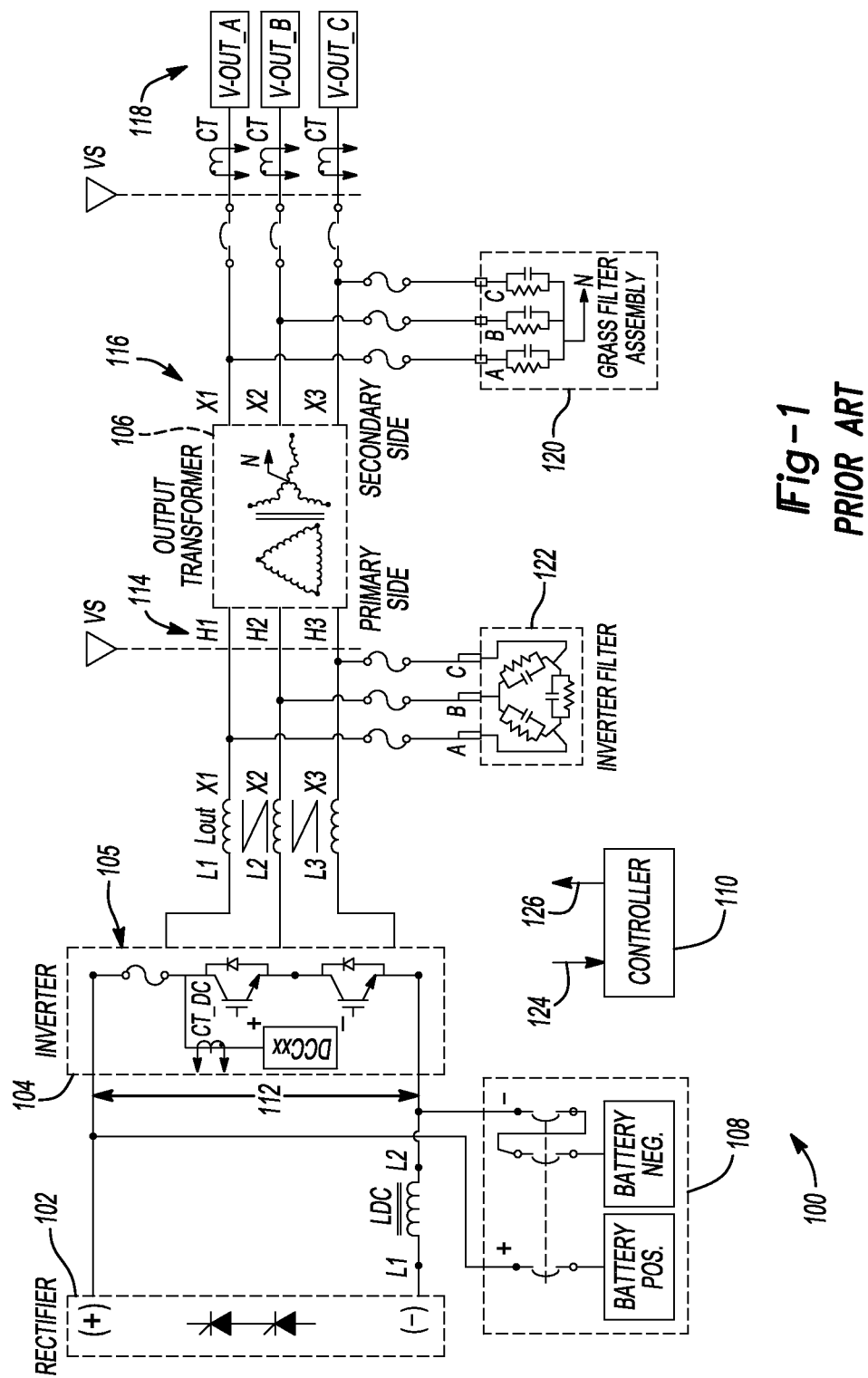
FIG. 1 is a simplified schematic of a prior art single module UPS system.
Figure 2:
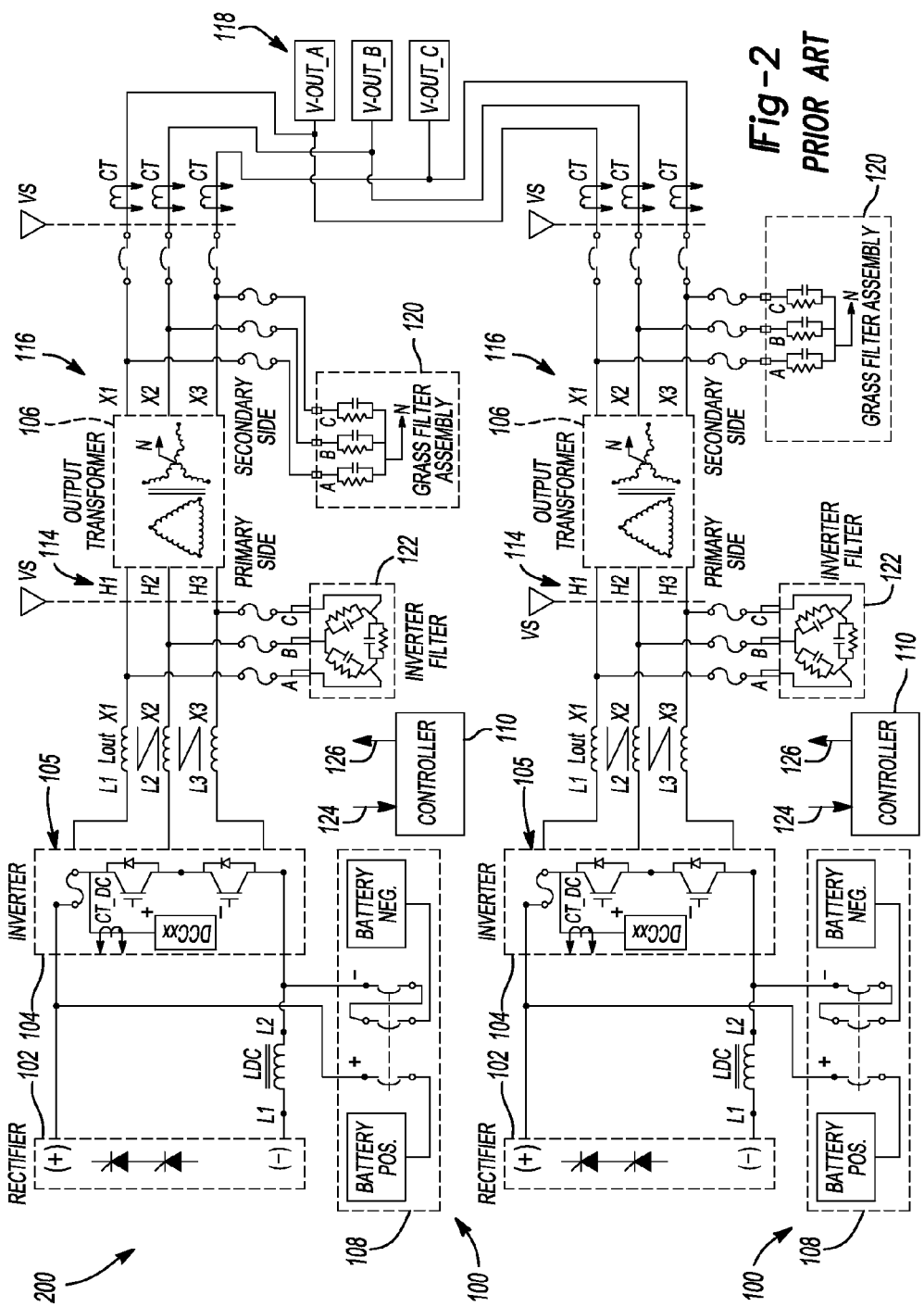
FIG. 2 is a simplified schematic of a prior art multimodule UPS system.
Figure 3:
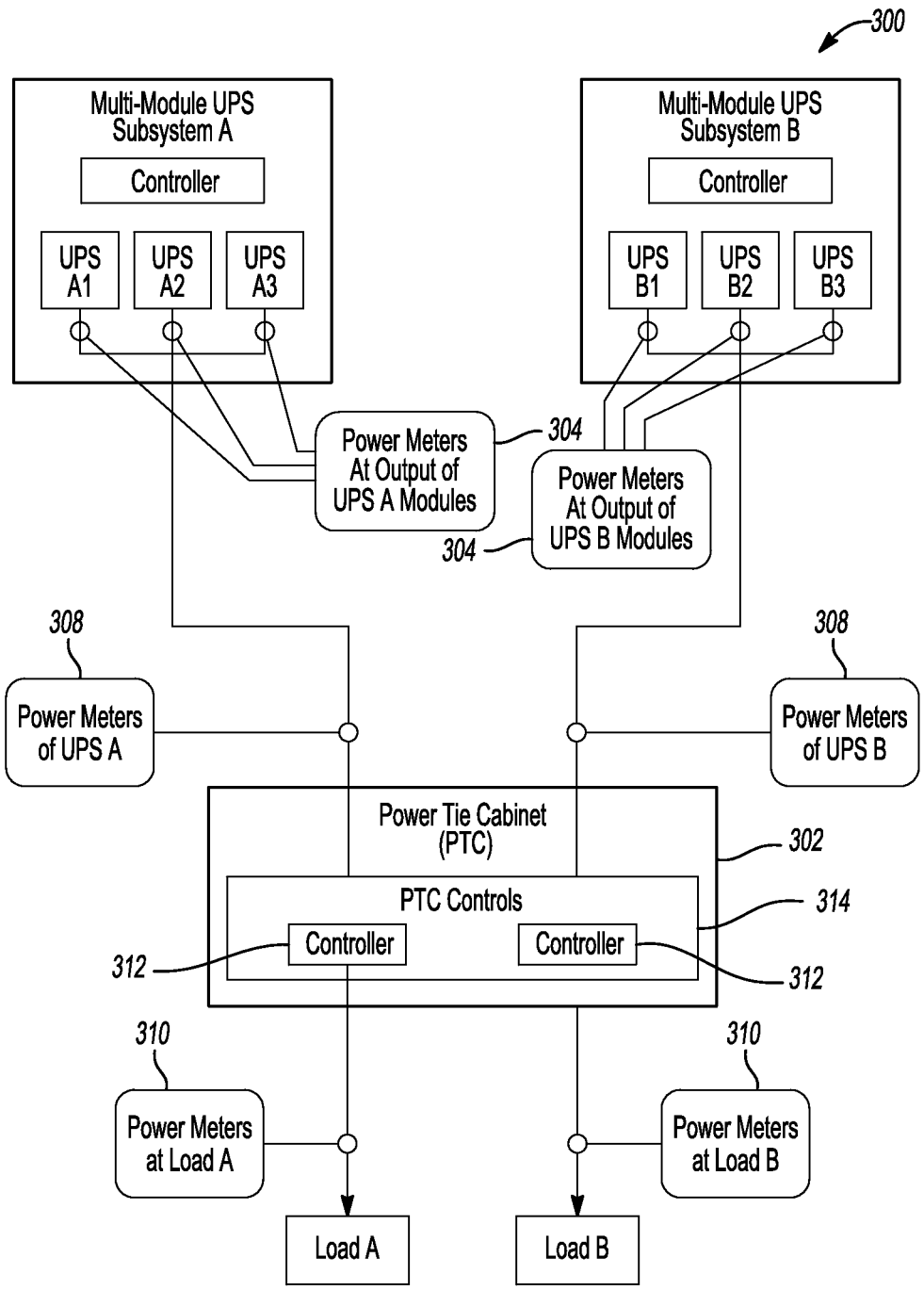
FIG. 3 is a simplified block diagram showing a multiple UPS system having a plurality of multimodule UPS systems, a multi-way power tie system and intelligent power sharing control, in accordance with an aspect of the present disclosure.

FIG. 3 shows a multiple UPS system 300 having a two-way power tie system with two multi-module UPS subsystems, referred to as multi-module UPS subsystem A and multi-module UPS subsystem B, connected through a power tie cabinet (PTC) 302 where the two multi-module UPS subsystems A and B are connected in parallel for redundancy or capacity. In the example embodiment shown in FIG. 3, both multi-module UPS subsystems A and B have three UPS modules connected in parallel to support a load A and a load B connected to respective outputs of the PTC. These UPS modules may, for example, each be a UPS module 100 shown in FIG. 1. The UPS modules for multi-module UPS subsystem A may be referred to herein as UPS A1, UPS A2, and UPS A3 and the UPS modules for multi-module UPS subsystem B are referred to herein as UPS B1, UPS B2, and UPS B3. It should be understood that multi-module UPS subsystems A and B can have other than three UPS modules. At the output of each UPS module in both multi-module UPS subsystems A and B, there are power meters 304 measuring each UPS module's output current and voltage. As is known, those power meters 304 are used to balance and control an output voltage of each paralleling UPS module within the multi-module UPS subsystem. It should be understood that the term "power meter" is used broadly to mean any device or combination of devices (hardware and/or software) that can be used to measure power. It may for example be a stand-alone device such as power meters conventionally used in utility power applications. It may for example utilize a current transformer and voltage sensor whose outputs are coupled to inputs of a controller, such as PTC controls 314, which then calculates the power based thereon.

In the illustrative embodiment shown in FIG. 3, there are two power meters 308 at the inputs of the PTC 302 connected to the respective multi-module UPS subsystems A and B, which are used to calculate each multi-module UPS subsystem's total output power including both cable power consumption between each multi-module UPS subsystem and the PTC 302 and actual multi-module UPS subsystem output power. In the illustrative embodiment shown in FIG. 3, there are another two power meters 310 located at respective outputs of the PTC 302 connected to respective loads (loads A and B in FIG. 3), which are used by the PTC controls 314, described below, to calculate the power drawn by the individual loads A and B. The power drawn by the loads (individually or collectively as the context dictates) may be referred to herein as load power.

In the PTC 302, there may illustratively be controllers 312, referred to collectively as PTC controls 314, connected through communication lines to each multi-module UPS subsystem A and B. These controllers may illustratively be implemented with one or more digital signal processors (DSPs) to process the data between multi-module UPS systems A and B and the PTC 302. It should be understood that these controllers may also be or include a Field Programmable Gate Array (FPGA), a microcontroller, microprocessor, CPLD, or ASIC, by way of example and not of limitation.

Figure 4:
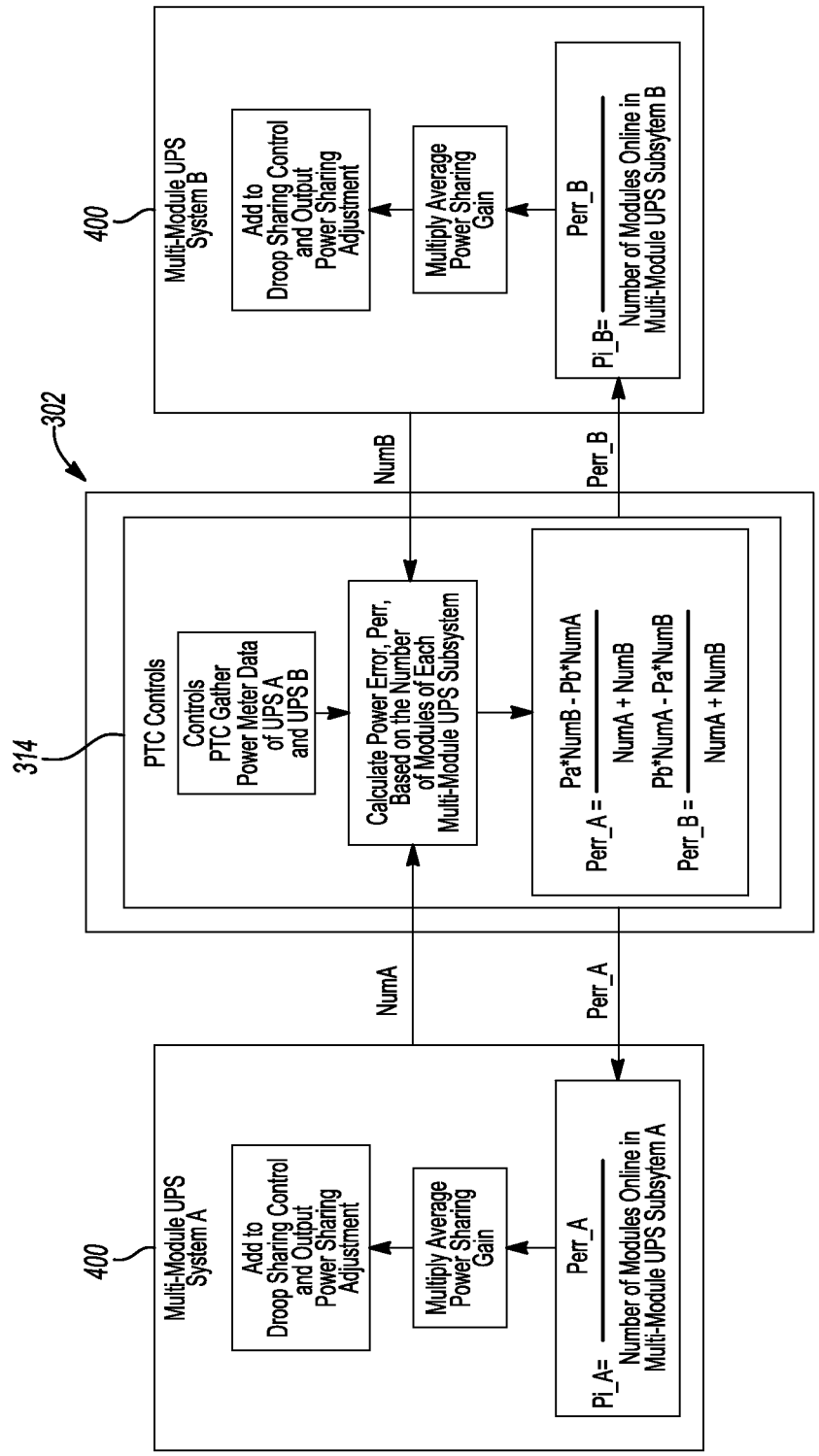
FIG. 4 is a block diagram showing the intelligent power sharing control of FIG. 3.

The PTC controls 314 will also collect and process the data from the power meter 308 that measures the power provided by multi-module UPS subsystem A to the PTC 302, the power meter 308 that measures the power provided by multi-module UPS subsystem B to the PTC 302, the power meter 310 that monitors the power provided by the PTC 302 to load A, and the power meter 310 that monitors the power provided by the PTC 302 to load B. Each multi-module UPS subsystem illustratively includes a controller 400 (FIG. 4).

This controller may be a Field Programmable Gate Array (FPGA), a microcontroller, microprocessor, CPLD, ASIC or DSP, by way of example and not of limitation.

Figure 5:
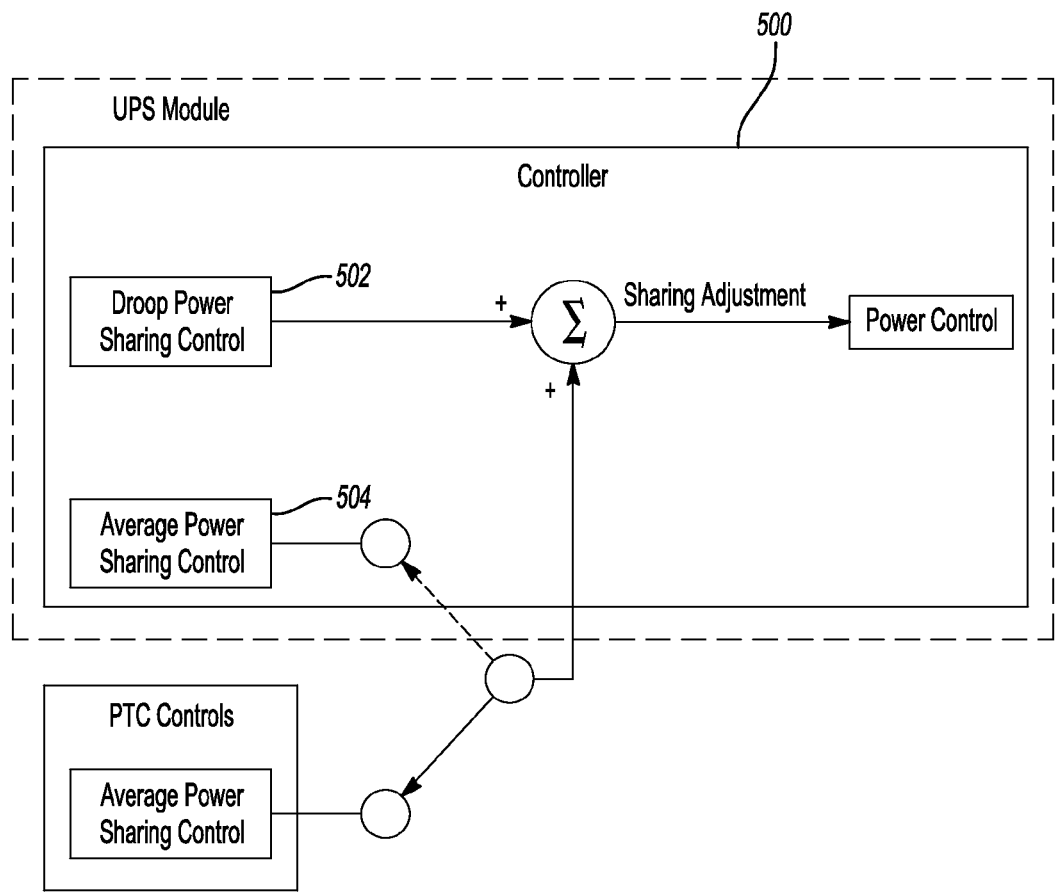
FIG. 5 is a block diagram showing a prior art example of regulation of power/load sharing when UPS modules are in parallel showing the basic elements of the droop power sharing control and average power sharing control loops.

In a known multi-module UPS subsystem, the UPS modules therein will measure their output power (via their respective power meters) and share equal power based on the power meter data collected. In one known method shown in FIG. 5, a controller 500 for each UPS module has two control loops regulating the power/load sharing when UPS modules are in parallel, i.e. a droop power sharing control loop 502 for droop power sharing and an average power sharing control loop 504 for average power sharing. Droop power sharing control loop 502 responds fast to swift load change to maintain equal power sharing, whereas average power sharing is used as an integral control loop based on power measurements to compensate for cable length difference, measurement error and other miscellaneous calculation error. In the above known method, droop power sharing control runs at every sample rate (which may for example be every 370 μsec.) and average power sharing control runs every 6 line cycles (e.g., 0.1 sec. in the case of 60 Hz). The block diagram of FIG. 5 shows an example of regulation of power/load sharing when UPS modules are in parallel showing the basic elements of the droop power sharing control and average power sharing control loops.

Data communications between multi-module UPS subsystems and the PTC is relatively slow compared to data communications between the UPS modules within a multi-module UPS subsystem. It is thus difficult to pass power meter data and other system related information between the PTC and each multi-module UPS subsystem within several line cycles as is done when passing power meter data between the UPS modules in a multi-module UPS subsystem.

In accordance with an aspect of the present disclosure, instead of passing power meter data between the PTC controls and multi-module UPS subsystems, a power error message is passed every 2 seconds from the PTC controls 314 of PTC 302 to each multi-module UPS subsystem. It should be understood that when it is said that the power error message is passed every 2 seconds, the 2 seconds can be plus or minus a tolerance that for example may be heuristically determined. It should also be understood that the power error message could be passed more frequently than every 2 seconds or less frequently. It should also be understood that the rate at which the power error message can be passed to each multi-module UPS subsystem is limited by the speed of the data communication between the PTC controls 302 and the controllers 500 of each multi-module UPS subsystem. From a control perspective, the rate at which power error message is passed to each multi-module UPS subsystem need not be any faster than the speed of the average power sharing control loop 504 of that multi-module UPS subsystem. The power error message for each multi-module UPS subsystem is the power error data for that multi-module UPS subsystem as a whole that will be used by that multi-module UPS subsystem to determine power error data for each UPS module within that multi-module UPS subsystem that is active. Within each multi-module UPS subsystem, instead of using each UPS modules' output power measurement to do average power control, the power error message is used to do average power control. Although the power error message will be slow, the droop power sharing control within each multi-module UPS subsystem will respond quick enough to maintain most of the load sharing among the UPS modules of the multi-module UPS subsystem. The rest of the power distribution error can be corrected slowly by the power error message from PTC controls 314. This is also because once a multi-module UPS subsystem is calibrated for a certain load, the average power control regulation can stay constant and thus it does not require a very fast communication. By using a slow communication between the PTC controls 314 and each multi-module UPS subsystem (compared to the communication between the UPS modules within each multi-module UPS subsystem), the multiple UPS system is more robust and the PTC power sharing control will not cause a big disturbance or instability issue upon the existing control loops regulating the power/load sharing when UPS modules are in parallel among the UPS modules within each multi-module UPS subsystem.

FIG. 4 is a block diagram showing a PTC power sharing control in accordance with an aspect of the present disclosure. After the PTC controls 314 gather power meter data from the power meters 308 for the power at the outputs of multi-module UPS subsystems A and B, the PTC controls 314 determine power error messages Perr_A and Perr_B based on the number of UPS modules online in each multi-module UPS subsystem. The power error messages Perr_A and Perr_B are calculated according to equations (1) and (2) below, which provide that the power will be distributed equally between the two multi-module UPS subsystems A and B.

$$\text{Perr\_A} = \frac{Pa * NumB - Pb * NumA}{NumA + NumB} \quad (1)$$

$$\text{Perr\_B} = \frac{Pb * NumA - Pa * NumB}{NumA + NumB} \quad (2)$$

Where Perr_A and Perr_B are the power error messages that the PTC controls send to multi-module UPS subsystem A and multi-module UPS subsystem B, respectively, every 2 seconds; Pa and Pb are the power meter data that the PTC controls collect from the power meter of multi-module UPS subsystem A and the power meter of multi-module UPS subsystem B, respectively; and NumA and NumB are the total number of UPS modules online in multi-module UPS subsystem A and multi-module UPS subsystem B, respectively.

The PTC controls send Perr_A and Perr_B as power error messages to the controllers 400 of each multi-module UPS subsystem A and B, respectively, every 2 seconds, which is a slow communication rate that the PTC 302 and the multi-module UPS subsystems A and B can handle. This communication rate is also sufficient for fair power sharing among the UPS modules within each of multi-module UPS subsystems A and B. When each multi-module UPS subsystem A and B gets the respective Perr_A and Perr_B power error message, its controller 400 will divide its respective the Perr_A or Perr_B by the number of UPS modules online in its system to get power error data Pi_A and Pi_B, respectively for the individual UPS modules A and B. Then Pi_A will be provided to the respective power average control loops 504 for the control of each UPS module in multi-module UPS subsystem A and Pi_B will be provided to the respective power average control loops 504 for the control of each UPS module in multi-module UPS subsystem B. In this way, the power tie sharing control will not interfere with the power sharing control of the individual UPS modules within a multi-module UPS subsystem and the change to the control algorithm for power sharing control among the UPS modules in a multi-module UPS subsystem will be minimized. That is, the change is essentially the utilization of the power error data Pi_A and Pi_B calculated using power error messages Perr_A and Perr_B in the respective power average control loops 504 for the control of the respective UPS modules within each multi-module UPS subsystem A and UPS subsystem B to replace the existing power error data used as an input to the power average control loop 504.

In addition, the foregoing can also be applied to any multi-way power tie system. Using three-way power tie system as an example (e.g., three multi-module UPS subsystems connected to the PTC 302 referred to as multi-module UPS subsystems A, B and C), the Perr (power error message) can be calculated in accordance with equation (3) using Perr_A as an example (with conforming changes made to equation (3) to calculate Perr_B and Perr_C), and the rest of the algorithm will be the same as the algorithm described above for a two-way power tie system.

$$\text{Perr\_A} = \frac{Pa * (NumB + NumC) - (Pb + Pc) * NumA}{NumA + NumB + NumC} \quad (3)$$

Where Perr_A is the power error message that PTC controls send to multi-module UPS subsystem A every 2 seconds; Pa is the power meter data that the PTC controls collect at the power meter of UPS A; NumA, NumB and NumC are the total number of modules online in multi-module UPS subsystems A, B and C, respectively.

For a multi-way power tie system with N multi-module UPS subsystems, the power error message of the $i^{th}$ multi-module UPS subsystem, Perr_i can be calculated in accordance with equation (4).

$$\text{Perr\_i} = \frac{Pi * \left(\sum_{k=1, k \neq i}^{N} \text{Num}_k\right) - \left(\sum_{k=1, k \neq i}^{N} P_k\right) * \text{Num}_i}{\sum_{k=1}^{N} \text{Num}_k} \quad (4)$$

Where $1 \leq i \leq N$, k is $k^{th}$ multi-module subsystem of N multi-module UPS subsystem, $1 \leq k \leq N$ Perr_i is the power error message of the $i^{th}$ multi-module UPS subsystem that the PTC controls send to the ith multi-module UPS subsystem every 2 seconds; Pi is the power meter data that the PTC controls collected at the power meter of the $i^{th}$ multi-module UPS subsystem; $\text{Num}_i$ is the number of modules online in the $i^{th}$ multi-module UPS subsystem, and N is the total number of multi-module UPS subsystems in the multiple UPS system.

This foregoing provides an effective solution to make a multi-way power tie system share the load equally among all UPS modules on-line within different multi-module UPS subsystems without unduly complicating the power sharing algorithms utilized by the multi-module UPS subsystems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method of power sharing control in a multiple uninterruptible power supply (UPS) system having a plurality of multi-module UPS subsystems coupled to a power tie cabinet, each multi-module UPS subsystem having a plurality of UPS modules, each UPS module having a controller having a droop power sharing control loop and an average power sharing control loop, the power tie cabinet including power tie cabinet controls (PTC) controls, the method comprising:

periodically determining with the PTC controls a power error message for each multi-module UPS subsystem and passing it to a controller of that multi-module UPS subsystem; and having the controller of each multi-module UPS subsystem use the power error message received from the PTC controls to determine power error data that it provides to the average power sharing control loop of the controller of each UPS module in that multi-module UPS subsystem and having the average power sharing control loop for each UPS module use the power error data for average power control.

2. The method of claim 1 wherein the multiple UPS system has N multi-module UPS subsystems and having the PTC controls determine the power error message (Perr_i) for an $i^{th}$ multi-module UPS subsystem in the multiple UPS system in accordance with the following equation:

$$\text{Perr\_i} = \frac{Pi * \left( \sum_{k=1, k \neq i}^{N} \text{Num}_k \right) - \left( \sum_{k=1, k \neq i}^{N} P_k \right) * \text{Num}_i}{\sum_{k=1}^{N} \text{Num}_k}$$

where $1 \leq i \leq N$, k is $k^{th}$ multi-module subsystem of the N multi-module UPS subsystem, $1 \leq k \leq N$, Pi is power meter data that the PTC controls collect at a power meter of the $i^{th}$ multi-module UPS subsystem; $\text{Num}_i$ is the number of UPS modules online in the $i^{th}$ multi-module UPS subsystem, and N is the total number of multi-module UPS subsystems in the multiple UPS system.

3. The method of claim 2 wherein passing the power error message for each multi-module UPS system to the controller of that multi-module UPS system includes passing it every two seconds.

4. The method of claim 1 wherein the multiple UPS system has two multi-module UPS subsystems A and B, and having the PTC controls determine the power error message (Perr_A) for multi-module UPS subsystem A and the power error message (Perr_B) for multi-module UPS subsystem B in accordance with the following equations:

$$\text{Perr\_A} = \frac{Pa * NumB - Pb * NumA}{NumA + NumB}$$

$$\text{Perr\_B} = \frac{Pb * NumA - Pa * NumB}{NumA + NumB}$$

where Pa and Pb are power meter data that the PTC controls collect from a power meter of multi-module UPS subsystem A and a power meter of multi-module UPS subsystem B, respectively; and NumA and NumB are the total number of UPS modules online in multi-module UPS subsystem A and multi-module UPS subsystem B, respectively.

5. The method of claim 4 wherein passing the power error message for each multi-module UPS system to the controller of that multi-module UPS system includes passing it every two seconds.

6. A multiple uninterruptible power supply (UPS) system, comprising:

a plurality of multi-module UPS subsystems coupled to a power tie cabinet, each multi-module UPS subsystem having a plurality of UPS modules;

each UPS module having a controller having a droop power sharing control loop and an average power sharing control loop;

the power tie cabinet including power tie cabinet (PTC) controls, the PTC controls periodically determining a power error message for each multi-module UPS subsystem and passing it to a controller of that multi-module UPS subsystem; and the controller of each multi-module UPS subsystem using the power error message received from the PTC controls to determine power error data that it provides to the average power sharing control loop of the controller of each UPS module in that multi-module UPS subsystem which is used by the average power sharing control loop for each UPS module for average power control.

7. The multiple UPS system of claim 6 wherein the multiple UPS system has N multi-module UPS subsystems, the PTC controls determine the power error message (Perr_i) for an $i^{th}$ multi-module UPS subsystem in the multiple UPS system in accordance with the following equation:

$$\text{Perr\_i} = \frac{Pi * \left( \sum_{k=1, k \neq i}^{N} \text{Num}_k \right) - \left( \sum_{k=1, k \neq i}^{N} P_k \right) * \text{Num}_i}{\sum_{k=1}^{N} \text{Num}_k}$$

where $1 \leq i \leq N$, k is $k^{th}$ multi-module subsystem of the N multi-module UPS subsystem, $1 \leq k \leq N$, Pi is power meter data that the PTC controls collect at a power meter of the $i^{th}$ multi-module UPS subsystem; $\text{Num}_i$ is the number of UPS modules online in the $i^{th}$ multi-module UPS subsystem, and N is the total number of multi-module UPS subsystems in the multiple UPS system.

8. The multiple UPS system of claim 7 wherein the power error message for each multi-module UPS system is passed to the controller of that multi-module UPS system every two seconds.

9. The multiple UPS system of claim 6 wherein the multiple UPS system has two multi-module UPS subsystems A and B, the PTC controls determine the power error message (Perr_A) for multi-module UPS subsystem A and the power error message (Perr_B) for multi-module UPS subsystem B in accordance with the following equations:

$$\text{Perr\_A} = \frac{Pa * NumB - Pb * NumA}{NumA + NumB}$$

$$\text{Perr\_B} = \frac{Pb * NumA - Pa * NumB}{NumA + NumB}$$

where Pa and Pb are power meter data that the PTC controls collect from a power meter of multi-module UPS subsystem A and a power meter of multi-module UPS subsystem B, respectively; and NumA and NumB are the total number of UPS modules online in multi-module UPS subsystem A and multi-module UPS subsystem B, respectively.

10. The multiple UPS system of claim 9 wherein the power error message for each multi-module UPS system is passed to the controller of that multi-module UPS system every two seconds.

* * * * *